(12) United States Patent
Ooishi et al.

(10) Patent No.: US 12,722,737 B2
(45) Date of Patent: Sep. 1, 2026

(54) METHOD FOR CALCULATING ENERGY INDEX, PROGRAM RELATED TO CALCULATION DEVICE FOR HUMAN-POWERED VEHICLE, AND CALCULATION DEVICE FOR HUMAN-POWERED VEHICLE

(71) Applicant: Shimano Inc., Sakai (JP)

(72) Inventors: Toshinari Ooishi, Sakai (JP); Koujirou Morii, Sakai (JP)

(73) Assignee: Shimano Inc., Osaka (JP)

( * ) Notice: Subject to any disclaimer, the term of this patent is extended or adjusted under 35 U.S.C. 154(b) by 398 days.

(21) Appl. No.: 18/384,257

(22) Filed: Oct. 26, 2023

(65) Prior Publication Data

US 2024/0166299 A1 May 23, 2024

(30) Foreign Application Priority Data

Nov. 21, 2022 (JP) ................................ 2022-185995

(51) Int. Cl.
*B62M 6/50* (2010.01)

(52) U.S. Cl.
CPC .................................... *B62M 6/50* (2013.01)

(58) Field of Classification Search
CPC . B62M 6/50; B62M 6/45; B62M 6/40; B62M 6/00; B62J 45/41; B62J 45/40; B62J 45/00; B62J 45/4152; B62J 45/415; B62J 50/22; B62J 50/21; B62J 50/20; B62J 45/20
See application file for complete search history.

(56) References Cited

U.S. PATENT DOCUMENTS 6,378,885 B1 * 4/2002 Ellsworth .............. B62K 25/30 280/284
6,540,244 B1 * 4/2003 Oda ......................... B62M 1/28 280/261
11,906,396 B1 * 2/2024 Laing, III ............... G01M 9/08
2011/0109060 A1 * 5/2011 Earle ...................... B62K 25/28 280/283
2017/0327113 A1 * 11/2017 Yamakado ........ B60W 50/0097

FOREIGN PATENT DOCUMENTS

JP 7-151620 A 6/1995
WO 2007/115073 A2 10/2007

* cited by examiner

*Primary Examiner* — Mohamed Charioui
(74) *Attorney, Agent, or Firm* — Spencer Fane, LLP

(57) ABSTRACT

A method is performed for calculating an energy index related to traveling of a human-powered vehicle from a first parameter related to traveling of the human-powered vehicle at a first travel point and a second parameter related to traveling of the human-powered vehicle at a second travel point differing from the first travel point. The first parameter includes a first vehicle speed and a first altitude at the first travel point. The second parameter includes a second vehicle speed and a second altitude at the second travel point.

15 Claims, 3 Drawing Sheets

V1

V2

P1

P2

H1

H2

METHOD FOR CALCULATING ENERGY INDEX, PROGRAM RELATED TO CALCULATION DEVICE FOR HUMAN-POWERED VEHICLE, AND CALCULATION DEVICE FOR HUMAN-POWERED VEHICLE

CROSS-REFERENCE TO RELATED APPLICATIONS

This application claims priority to Japanese Patent Application No. 2022-185995, filed on Nov. 21, 2022. The entire disclosure of Japanese Patent Application No. 2022-185995 is hereby incorporated herein by reference.

BACKGROUND

Technical Field

The present disclosure generally relates to a method for calculating an energy index, a non-transitory computer-readable medium encoded with an energy index calculation program related to a calculation device for a human-powered vehicle, and a calculation device for a human-powered vehicle.

Background Information

Japanese Laid-Open Patent Publication No. 7-151620 (Patent Document 1) discloses a power measuring device for a human-powered vehicle configured to measure the power applied to a pedal by the rider of the human-powered vehicle in a case where the human-powered vehicle travels as the driver pedals.

SUMMARY

An object of the present disclosure is to provide a method for calculating an energy index, a program related to a calculation device for a human-powered vehicle, and a calculation device for a human-powered vehicle that allow for calculation of an energy index related to traveling of the human-powered vehicle.

A method is performed for calculating an energy index in accordance with a first aspect of the present disclosure. The method basically comprises calculating the energy index related to traveling of a human-powered vehicle from a first parameter related to traveling of the human-powered vehicle at a first travel point and a second parameter related to traveling of the human-powered vehicle at a second travel point differing from the first travel point. The first parameter includes a first vehicle speed and a first altitude at the first travel point. The second parameter includes a second vehicle speed and a second altitude at the second travel point.

The energy index calculation method according to the first aspect allows for calculation of the energy index related to traveling of the human-powered vehicle from the vehicle speed and the altitude at each of the first travel point and the second travel point. The altitude difference between the first travel point and the second travel point relates to potential energy. Thus, the energy index calculation method according to the first aspect allows for calculation of the energy index reflecting the potential energy.

In accordance with a second aspect of the present disclosure, the method for calculating an energy index according to the first aspect is configured so that the energy index includes a first energy index related to energy loss of the human-powered vehicle that is traveling in a case where the human-powered vehicle moves from the first travel point to the second travel point.

The energy index calculation method according to the second aspect allows for calculation of the first energy index related to the energy loss of the human-powered vehicle that is traveling in a case where the human-powered vehicle moves from the first travel point to the second travel point.

In accordance with a third aspect of the present disclosure, the method for calculating an energy index according to the second aspect is configured so that the calculating of the energy index further includes calculating the first energy index from the first parameter, the second parameter, and a third parameter related to weight of at least one of the human-powered vehicle and a rider.

With the energy index calculation method according to the third aspect, the first energy index is calculated from the third parameter in addition to the first parameter and the second parameter. This allows for calculation of the first energy index reflecting the third parameter.

In accordance with a fourth aspect of the present disclosure, the method for calculating an energy index according to the third aspect is configured so that the calculating of the energy index further includes calculating the first energy index from at least one of a fourth parameter related to a driving force of the human-powered vehicle during a period in which the human-powered vehicle moves from the first travel point to the second travel point, a fifth parameter related to a braking force of a brake device of the human-powered vehicle during the period in which the human-powered vehicle moves from the first travel point to the second travel point, and a sixth parameter related to a travel resistance of the human-powered vehicle during the period in which the human-powered vehicle moves from the first travel point to the second travel point in addition to the first parameter, the second parameter, and the third parameter.

With the energy index calculation method according to the fourth aspect, the first energy index is calculated from at least one of the fourth parameter, the fifth parameter, and the sixth parameter, in addition to the first parameter, the second parameter, and the third parameter. This allows for calculation of the first energy index reflecting at least one of the fourth parameter, the fifth parameter, and the sixth parameter.

In accordance with a fifth aspect of the present disclosure, the method for calculating an energy index according to the fourth aspect is configured so that the fourth parameter is obtained from a cumulative sum of the driving force during the period in which the human-powered vehicle moves from the first travel point to the second travel point.

In a case where the first energy index is calculated from the fourth parameter, the energy index calculation method according to the fifth aspect allows for calculation of the first energy index using the cumulative sum of the driving force of the human-powered vehicle.

In accordance with a sixth aspect of the present disclosure, the method for calculating an energy index according to the fourth or fifth aspect is configured so that the fifth parameter is obtained from a pre-braking vehicle speed before the brake device is actuated and a post-braking vehicle speed after the brake device is actuated during a period in which the human-powered vehicle moves from the first travel point to the second travel point.

In a case where the first energy index is calculated from the fifth parameter, the energy index calculation method according to the sixth aspect allows for calculation of the first energy index using the fifth parameter obtained from the vehicle speed before the brake device is actuated and the vehicle speed after the brake device is actuated during the period in which the human-powered vehicle moves from the first travel point to the second travel point.

In accordance with a seventh aspect of the present disclosure, the method for calculating an energy index according to any one of the fourth to sixth aspects is configured so that the fifth parameter is obtained from a detection result of a detecting device configured to measure the braking force of the brake device.

In a case where the first energy index is calculated from the fifth parameter, the energy index calculation method according to the seventh aspect allows for calculation of the first energy index from the detection result of the detecting device configured to measure the braking force of the brake device.

In accordance with an eighth aspect of the present disclosure, the method for calculating an energy index according to the second aspect is configured so that the calculating of the energy index further includes calculating a first potential energy of the human-powered vehicle at the first travel point and a first kinetic energy of the human-powered vehicle at the first travel point from the first parameter and a third parameter related to weight of at least one of the human-powered vehicle and a rider, calculating a second potential energy of the human-powered vehicle at the second travel point and a second kinetic energy of the human-powered vehicle at the second travel point from the second parameter and the third parameter, and calculating the first energy index from a first value obtained by subtracting a second sum of the second potential energy and the second kinetic energy from a first sum of the first potential energy and the first kinetic energy.

The energy index calculation method according to the eighth aspect allows for calculation of the first energy index from the first value obtained by subtracting the second sum of the second potential energy and the second kinetic energy from the first sum of the first potential energy and the first kinetic energy.

In accordance with a ninth aspect of the present disclosure, the method for calculating an energy index according to the eighth aspect is configured so that the calculating of the energy index further includes calculating the first energy index from the first value and at least one of a driving force of the human-powered vehicle during a period in which the human-powered vehicle moves from the first travel point to the second travel point, a braking force of a brake device of the human-powered vehicle during the period in which the human-powered vehicle moves from the first travel point to the second travel point, and a travel resistance of the human-powered vehicle during the period in which the human-powered vehicle moves from the first travel point to the second travel point.

The energy index calculation method according to the ninth aspect allows for calculation of the first energy index from the first value and at least one of the driving force of the human-powered vehicle during the period in which the human-powered vehicle moves from the first travel point to the second travel point, the braking force of the brake device of the human-powered vehicle during the period in which the human-powered vehicle moves from the first travel point to the second travel point, and the travel resistance of the human-powered vehicle during the period in which the human-powered vehicle moves from the first travel point to the second travel point.

In accordance with a tenth aspect of the present disclosure, the method for calculating an energy index according to the second aspect is configured so that the energy index includes a second energy index related to an energy efficiency of the human-powered vehicle in a case where the human-powered vehicle moves from the first travel point to the second travel point. The calculating of the energy index further includes calculating a first potential energy of the human-powered vehicle at the first travel point and a first kinetic energy of the human-powered vehicle at the first travel point from the first parameter and a third parameter related to weight of at least one of the human-powered vehicle and a rider, calculating a second potential energy of the human-powered vehicle at the second travel point and a second kinetic energy of the human-powered vehicle at the second travel point from the second parameter and the third parameter, and calculating the second energy index from a ratio of a first sum of the first potential energy and the first kinetic energy and a second sum of the second potential energy and the second kinetic energy.

The energy index calculation method according to the tenth aspect allows for calculation of the second energy index from the ratio of the first sum of the first potential energy and the first kinetic energy and the second sum of the second potential energy and the second kinetic energy.

In accordance with an eleventh aspect of the present disclosure, the method for calculating an energy index according to any one of the first to tenth aspects is configured so that distance traveled from the first travel point to the second travel point is greater than 0 m and less than or equal to 10 m.

The energy index calculation method according to the eleventh aspect allows for calculation of the energy index in a case where the distance traveled is greater than 0 m and less than or equal to 10 m.

In accordance with a twelfth aspect of the present disclosure, the method for calculating an energy index according to any one of the first to eleventh aspects is configured so that time traveled from the first travel point to the second travel point is greater than 0 seconds and less than or equal to 10 seconds.

The energy index calculation method according to the twelfth aspect allows for calculation of the energy index in a case where the time traveled is greater than 0 seconds and less than or equal to 10 seconds.

In accordance with a thirteenth aspect of the present disclosure, the method for calculating an energy index according to any one of the first to twelfth aspects is configured so that the calculating of the energy index further includes calculating the energy index at the first travel point and the second travel point that are continuous downhills or continuous uphills.

The energy index calculation method according to the thirteenth aspect allows for calculation of the energy index from the first parameter and the second parameter in a case where the first travel point and the second travel point are continuous downhills. The energy index calculation method according to the thirteenth aspect allows for calculation of the energy index from the first parameter and the second parameter in a case where the first travel point and the second travel point are continuous uphills.

A method is performed for calculating an energy index in accordance with a fourteenth aspect of the present disclosure. The method basically comprises calculating the energy index that is related to traveling of a human-powered vehicle from a difference of a first mechanical energy of the human-powered vehicle including a first potential energy of the human-powered vehicle at a first travel point and a second mechanical energy of the human-powered vehicle including a second potential energy of the human-powered vehicle at a second travel point differing from the first travel point.

The energy index calculation method according to the fourteenth aspect allows for calculation of the energy index related to traveling of the human-powered vehicle from the difference of the first mechanical energy and the second mechanical energy.

In accordance with a fifteenth aspect of the present disclosure, the method for calculating an energy index according to the fourteenth aspect is configured so that the first mechanical energy index includes a first kinetic energy of the human-powered vehicle at the first travel point. The second mechanical energy includes a second kinetic energy of the human-powered vehicle at the second travel point.

The energy index calculation method according to the fifteenth aspect allows for calculation of the energy index from the difference of the first mechanical energy including the first potential energy and the first kinetic energy and the second mechanical energy including the second potential energy and the second kinetic energy.

A non-transitory computer-readable medium encoded with an energy index calculation program, which when executed by a calculation device for a human-powered vehicle is provided in accordance with a sixteenth aspect of the present disclosure. The energy index calculation program causes the calculation device to perform operations comprising calculating the energy index through the energy index calculation method according to any one of the first to fifteenth aspects.

The non-transitory computer-readable medium encoded with an energy index calculation program according to the sixteenth aspect allows for calculation of the energy index related to traveling of the human-powered vehicle by having the calculation device execute the process for calculating the energy index.

A calculation device for a human-powered vehicle in accordance with a seventeenth aspect of the present disclosure comprises a calculator configured to calculate the energy index through the energy index calculation method according to any one of the first to fifteenth aspects.

With the calculation device according to the seventeenth aspect, the calculator obtains the energy index related to traveling of the human-powered vehicle through the energy index calculation method.

In accordance with an eighteenth aspect of the present disclosure, the calculation device according to the seventeenth aspect is configured to be mountable on the human-powered vehicle. The calculation device further comprises a first detector configured to detect the first parameter and a second detector configured to detect the second parameter.

With the calculation device according to the eighteenth aspect, the calculator calculates the energy index related to traveling of the human-powered vehicle from the first parameter detected by the first detector and the second parameter detected by the second detector.

The method for calculating an energy index, the non-transitory computer-readable medium encoded with an energy index calculation program related to a calculation device for a human-powered vehicle, and the calculation device for a human-powered vehicle in accordance with the present disclosure allow for calculation of the energy index related to traveling of the human-powered vehicle.

BRIEF DESCRIPTION OF THE DRAWINGS

Referring now to the attached drawings which form a part of this original disclosure.

FIG. 2 is a block diagram showing the electrical configuration of the human-powered vehicle including the human-powered vehicle calculation device shown in FIG. 1.

DETAILED DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
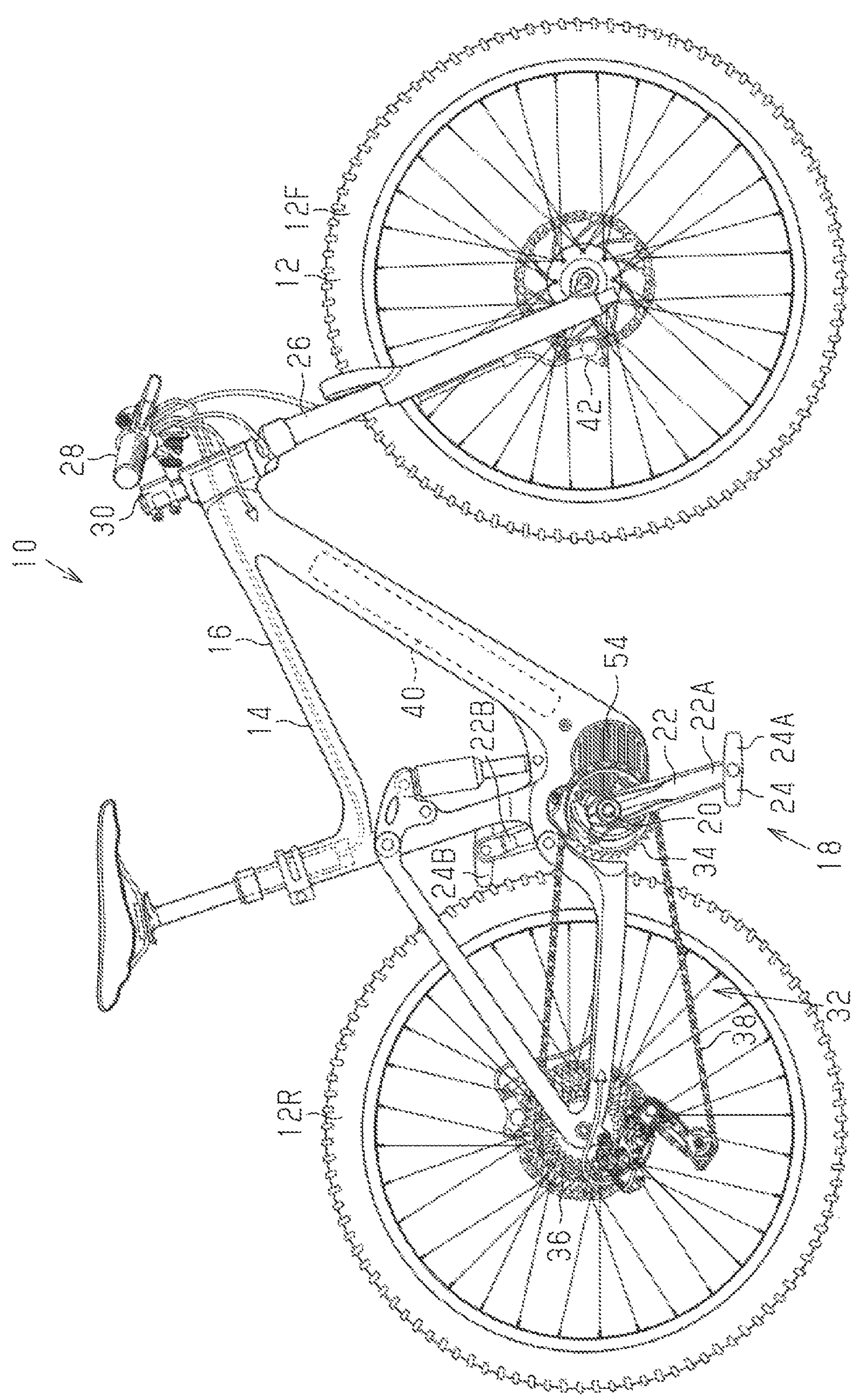
FIG. 1 is a side elevational view of a human-powered vehicle including a human-powered vehicle calculation device configured to execute an energy index calculation program related to the human-powered vehicle calculation device for calculating an energy index in accordance with each disclosed embodiment.

As shown in FIG. 1, a human-powered vehicle 10 is illustrated that is equipped with a human-powered vehicle calculation device 60 for performing an energy calculation method for calculating an energy index provided to an energy calculation. The human-powered vehicle calculation device 60 in accordance with a first embodiment will now be described with reference to FIGS. 1 to 4. A human-powered vehicle is a vehicle that has at least one wheel and can be driven by at least a human driving force that is a driving force of the human-powered vehicle. Examples of human-powered vehicles include various types of bicycles such as a mountain bike, a road bike, a city bike, a cargo bike, a handcycle, and a recumbent bike. There is no limit to the number of wheels of the human-powered vehicle. The human-powered vehicle also includes, for example, a unicycle or a vehicle having two or more wheels. The human-powered vehicle is not limited to a vehicle that can be driven only by human driving force. The human-powered vehicle includes an electric bicycle (E-bike) that uses drive force of an electric motor for propulsion in addition to a human driving force. The E-bike includes an electric assist bicycle that assists in propulsion with an electric motor. In the embodiment described hereafter, the human-powered vehicle 10 will be described as a bicycle.

As shown in FIG. 1, the human-powered vehicle 10 includes at least one wheel 12 and a vehicle body 14. The at least one wheel 12 includes a front wheel 12F and a rear wheel 12R. The vehicle body 14 includes a frame 16. For example, a saddle is attached to the frame 16. The human-powered vehicle 10 further includes, for example, a crank 18 to which a human driving force is input. The crank 18 includes, for example, a crank axle 20 and a crank arm 22. The crank axle 20 is, for example, rotatable relative to the frame 16.

For example, a pedal 24 is coupled to the crank arm 22. The crank 18 includes, for example, a first crank arm 22A and a second crank arm 22B. The pedal 24 includes, for example, a first pedal 24A and a second pedal 24B. For example, the first crank arm 22A and the second crank arm 22B are provided on two axial ends of the crank axle 20, respectively. The first pedal 24A is coupled to the first crank arm 22A. For example, the second pedal 24B is coupled to the second crank arm 22B.

A front fork 26 is connected to the frame 16. The front wheel 12F is attached to the front fork 26. A handlebar 28 is coupled to the front fork 26 by a stem 30. The rear wheel 12R is supported by the frame 16. In the present embodiment, the crank 18 is connected to the rear wheel 12R by a drive mechanism 32. The rear wheel 12R is driven by the rotation of the crank axle 20. At least one of the front wheel 12F and the rear wheel 12R can be connected to the crank 18 by the drive mechanism 32.

The drive mechanism 32 includes a first rotational body 34 coupled to the crank axle 20. The first rotational body 34 includes, for example, a front sprocket. The first rotational body 34 can include a pulley or a bevel gear. The crank axle 20 can be coupled to the front sprocket by a one-way clutch.

The drive mechanism 32 further includes a second rotational body 36 and a transferring member 38. The transferring member 38 is configured to transmit the rotational force of the first rotational body 34 to the second rotational body 36. The transferring member 38 includes, for example, a chain. The transferring member 38 can include a belt or a shaft. The second rotational body 36 includes, for example, a rear sprocket. The second rotational body 36 can include a pulley or a bevel gear. The chain is wound around, for example, the front sprocket and the rear sprocket. The second rotational body 36 is coupled to, for example, the rear wheel 12R. The rear wheel 12R is configured to be rotated as the second rotational body 36 rotates.

The human-powered vehicle 10 further includes, for example, a human-powered vehicle battery 40. The battery 40 includes, for example, one or more battery cells. Each battery cell includes, for example, a rechargeable battery. The battery 40 is configured to supply electric power to, for example, a calculator 62. For example, the battery 40 is connected to the calculator 62 in a manner allowing for wired communication or wireless communication. The battery 40 is configured to perform communication with the calculator 62 through, for example, power line communication (PLC). The battery 40 can be configured to perform communication with the calculator 62 through Controller Area Network (CAN) or universal asynchronous receiver/transmitter (UART).

The human-powered vehicle 10 further includes, for example, a brake device 42. For example, the brake device 42 is provided on the human-powered vehicle 10 to brake the wheel 12. For example, the brake device 42 is provided on the human-powered vehicle 10 to brake at least one of the front wheel 12F and the rear wheel 12R. For example, the brake device 42 is mechanically or electrically driven in accordance with operation of a brake operating unit provided on the human-powered vehicle 10. The brake device 42 includes, for example, a rim brake that brakes a rim of the human-powered vehicle 10. The brake device 42 can include a disc brake that brakes a disc brake rotor provided on the human-powered vehicle 10.

The human-powered vehicle 10 can further include a motor 54. The motor 54 is configured to drive the transferring member 38. For example, the motor 54 is configured to apply a propulsion force to the human-powered vehicle 10 in accordance with the human driving force input to the human-powered vehicle 10. The motor 54 includes, for example, one or more electric motors. The electric motor of the motor 54 is, for example, a brushless motor. For example, the motor 54 is configured to transmit the rotational force to a power transmission path of the human driving force extending from the pedal 24 to the second rotational body 36. For example, the motor 54 drives the transferring member 38 via the first rotational body 34. In the present embodiment, the motor 54 is provided on the frame 16 and is configured to transmit the rotational force to the first rotational body 34. The motor 54 can be a hub motor provided on the front wheel 12F or the rear wheel 12R. The human-powered vehicle 10 further includes, for example, a housing in which the motor 54 is provided. For example, the motor 54 and the housing are included in a drive unit.

As shown in FIG. 2, the human-powered vehicle 10 further includes one or more detectors for detecting one or more operating conditions of the human-powered vehicle 10. The term "detector" as used herein refers to a hardware device or instrument designed to detect the presence or absence of a particular event, object, substance, or a change in its environment, and to emit a signal in response. The term "detector" as used herein do not include a human being. For example, the human-powered vehicle 10 further includes, a detecting device 44. For example, the detecting device 44 is connected to the calculator 62 in a manner allowing for wired communication or wireless communication. For example, the detecting device 44 is configured to measure a braking force of the brake device 42. The detecting device 44 includes, for example, a force sensor 46. In a case where the brake device 42 includes a rim brake, for example, the force sensor 46 is configured to detect the braking force applied to the rim of the human-powered vehicle 10. The force sensor 46 is configured to output the detected braking force to the calculator 62. In a case where the brake device 42 includes a rim brake, for example, the force sensor 46 is provided on a friction member contactable with the rim of the human-powered vehicle 10 and detects the pressing force of the friction member. In a case where the brake device 42 includes a disc brake, for example, the force sensor 46 is configured to detect the braking force applied to the disc brake rotor of the human-powered vehicle 10. In a case where the brake device 42 includes a disc brake, for example, the force sensor 46 is provided on a friction member contactable with the disc brake rotor of the human-powered vehicle 10 and detects the pressing force of the friction member. Thus, the term "detector" as used herein do not include a human being.

The human-powered vehicle 10 further includes, for example, a human driving force detector 48. For example, the human driving force detector 48 is connected to the calculator 62 in a manner allowing for wired communication or wireless communication. For example, the human driving force detector 48 is configured to output a signal corresponding to the torque applied to the crank axle 20 by a human driving force. The signal corresponding to the torque applied to the crank axle 20 by the human driving force includes information related to the human driving force input to the human-powered vehicle 10. The signal from the force sensor 46 is outputted to the calculator 62.

The human driving force detector 48 is provided on, for example, a member included in a transmission path of human driving force or a member arranged near the member included in the transmission path of human driving force. The member included in the transmission path of human driving force includes, for example, the crank axle 20 and a member that transmits human driving force between the crank axle 20 and the first rotational body 34. The human driving force detector 48 is provided on, for example, an outer circumferential portion of the crank axle 20. The human driving force detector 48 includes, for example, a strain gauge, a magnetostrictive sensor, a pressure sensor, or the like. The human driving force detector 48 can have any configuration as long as the information related to human driving force is obtained.

The human driving force detector 48 is provided on, for example, at least one of the first crank arm 22A, the second crank arm 22B, the first pedal 24A, and the second pedal 24B. In a case where the human driving force detector 48 is provided on at least one of the first pedal 24A and the second pedal 24B, the human driving force detector 48 can include a sensor that detects the force applied to the at least one of the first pedal 24A and the second pedal 24B. In a case where the transferring member 38 includes a chain, the human driving force detector 48 can be provided on the chain. In a case where the human driving force detector 48 is provided on the chain, the human driving force detector 48 can include a sensor that detects the tension on the chain.

In a case where the human-powered vehicle 10 includes the motor 54, the human-powered vehicle 10 can include a motor driving force detector that detects the driving force of the motor 54. The motor driving force detector can be configured to detect the driving force of the motor 54 with a sensor provided on the motor 54 or in a transmission path of the driving force of the motor 54. The motor driving force detector can be configured to obtain control information used by a motor controller, configured to control the motor 54, to control the motor 54. In a case where the human-powered vehicle 10 includes the motor 54, and the human driving force detector 48 is provided on a member that combines the human driving force and the driving force of the motor 54, the human driving force detector 48 can detect the human driving force and the driving force of the motor 54.

The human-powered vehicle 10 further includes, for example, a travel resistance detector 50. For example, the travel resistance detector 50 is configured to detect a travel resistance of the human-powered vehicle 10. The travel resistance detector 50 includes, for example, a processor. The processor included in the travel resistance detector 50 can be substantially the same as a processor 62A included in the calculator 62. The travel resistance detector 50 includes, for example, a travel resistance detection sensor that detects a parameter related to the travel resistance of the human-powered vehicle 10. For example, the travel resistance detector 50 calculates the travel resistance from a detection result of the travel resistance detection sensor. The travel resistance calculated by from the travel resistance detector 50 is outputted to the calculator 62.

The parameter related to the travel resistance of the human-powered vehicle 10 includes, for example, at least one of the air resistance of the human-powered vehicle 10, the rolling resistance of the wheel 12, the gradient resistance of a road traveled by the human-powered vehicle 10, the acceleration resistance of the human-powered vehicle 10, a parameter for calculating the air resistance of the human-powered vehicle 10, a parameter for calculating the rolling resistance of the wheel 12, a parameter for calculating the gradient resistance of a road traveled by the human-powered vehicle 10, and a parameter for detecting the acceleration resistance of the human-powered vehicle 10. The travel resistance detection sensor includes at least one of an inclination sensor, a wind speed sensor, an acceleration sensor, and an air pressure sensor. The inclination sensor includes, for example, a gyro sensor.

The processor of the travel resistance detector 50 calculates the gradient resistance of a road traveled by the human-powered vehicle 10 from, for example, a detection result of the inclination sensor. The processor of the travel resistance detector 50 calculates the air resistance of the human-powered vehicle 10 from, for example, a detection result of the wind speed sensor. The processor of the travel resistance detector 50 calculates the acceleration resistance of the human-powered vehicle 10 from, for example, a detection result of the acceleration sensor. The processor of the travel resistance detector 50 can be configured to calculate the travel resistance in accordance with the human driving force, the driving force of the motor 54 provided on the human-powered vehicle 10 to apply a propulsion force to the human-powered vehicle 10, and the vehicle speed of the human-powered vehicle 10.

The human-powered vehicle calculation device 60 includes the calculator 62. The calculator 62 is configured to calculate an energy index through a method for calculating an energy index. For example, the calculation device 60 is configured to be mountable on the human-powered vehicle 10. For example, the calculation device 60 can be provided on a human-powered vehicle component that is configured to be mountable on the human-powered vehicle 10.

The calculator 62 is formed of one or more semiconductor chips that are mounted on a circuit board. The calculator 62 can also be referred to as an electronic controller. Thus, the terms "electronic controller" and "calculator" as used herein refer to hardware that executes a software program, and does not include a human being. The calculator 62 includes, for example, one or more processor 62A that executes a predetermined control program. The predetermined control program includes, for example, an energy index program related to the human-powered vehicle calculation device 60. The energy index program related to the human-powered vehicle calculation device 60 is configured to have the calculation device 60 execute a process for calculating the energy index through the energy index calculation method. The processor 62A includes, for example, a central processing unit (CPU) or a micro processing unit (MPU). The calculator 62 can include one or more microcomputers. The calculator 62 can include a plurality of processors 62A located at separate positions. The program related to the human-powered vehicle calculation device 60 is stored in, for example, a storage medium such as a non-transitory computer-readable medium encoded with an energy index calculation. For example, the calculator 62 performs the process for calculating the energy index through the energy index calculation method by executing the energy index program related to the human-powered vehicle calculation device 60. The storage medium includes, for example, storage 64. The storage 64 is any computer storage device or any non-transitory computer-readable medium with the sole exception of a transitory, propagating signal.

The calculation device 60 further includes, for example, the storage 64. The storage 64 stores, for example, control programs and information used for control processes. The storage 64 stores, for example, the program related to the human-powered vehicle calculation device 60. The storage 64 includes, for example, at least one of a non-volatile memory and a volatile memory. The non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM). For example, the storage 64 is configured to establish wired communication or wireless communication with the calculator 62. The program related to the human-powered vehicle calculation device 60 is stored in, for example, the storage 64.

The human-powered vehicle 10 further includes, for example, a communication unit 52. The term "communication unit" as used herein refers to a device or devices, and does not include a human being. The communication unit 52 can also be referred to as a communicator. For example, the communication unit 52 is configured to establish communication with an external device. For example, the communication unit 52 is configured to perform at least one of wired communication and wireless communication with an external device. For example, the communication unit 52 is configured to transmit information related to the energy index obtained by the calculator 62 to an external device. The external device includes, for example, at least one of a personal computer, a smartphone, and a tablet computer. For example, the external device is configured to show display information related to the energy index. For example, the external device is configured to generate the display information related to the energy index based on the energy index. The display information includes, for example, information for showing the energy index by at least one of a numerical value, text, and graphics. In a case where the display information includes information for showing the energy index by graphics, the energy index can be displayed with a map.

The human-powered vehicle 10 can include a display unit instead of or in addition to the communication unit 52. The display unit includes, for example, at least one of a cycle computer and a smartphone. For example, the display unit is configured to show the display information related to the energy index. In a case where the human-powered vehicle 10 includes the display unit, for example, the calculator 62 can be configured to generate the display information related to the energy index based on the energy index.

The method for calculating an energy index includes a first process for calculating the energy index related to traveling of the human-powered vehicle 10 from a first parameter related to traveling of the human-powered vehicle 10 at a first travel point P1 and a second parameter related to traveling of the human-powered vehicle 10 at a second travel point P2 differing from the first travel point P1. The first parameter includes a first vehicle speed V1 and a first altitude H1 at the first travel point P1. The second parameter includes a second vehicle speed V2 and a second altitude H2 at the second travel point P2.

The calculation device 60 further includes, for example, a first detector 66A and a second detector 66B. The first detector 66A detects the first parameter. The second detector 66B detects the second parameter. For example, the first detector 66A and the second detector 66B are configured by a single detector 66. The first detector 66A and the second detector 66B can be separate detectors. In a case where the first detector 66A and the second detector 66B are separate detectors, for example, the first detector 66A and the second detector 66B each have the same configuration as the detector 66.

The detector 66 is, for example, connected to the calculator 62 in a manner allowing for wired communication or wireless communication. The detector 66 includes, for example, a vehicle speed detector. The vehicle speed detector is configured to detect, for example, information related to the speed of the human-powered vehicle 10. The vehicle speed detector is configured to detect, for example, information related to the rotational speed of the wheel 12. The vehicle speed detector is configured to detect, for example, a magnet provided on at least one of the front wheel 12F and the rear wheel 12R.

The vehicle speed detector is, for example, configured to output a predetermined number of detection signals during a period in which the wheel 12 completes one rotation. The predetermined number is, for example, one. The vehicle speed detector outputs, for example, a signal corresponding to the rotational speed of the wheel 12. The calculator 62 can obtain the speed of the human-powered vehicle 10 from the signal corresponding to the rotational speed of the wheel 12 and information related to the circumferential length of the wheel 12. The information related to the circumferential length of the wheel 12 is stored in, for example, the storage 64.

The detector 66 further includes, for example, an altitude detector. The altitude detector is configured to detect, for example, information related to the altitude of the human-powered vehicle 10. The altitude detector includes, for example, an atmospheric pressure sensor that detects atmospheric pressure. In a case where the altitude detector includes the atmospheric pressure sensor, for example, the storage 64 stores a table related to atmospheric pressure and altitude. In a case where the altitude detector includes the atmospheric pressure sensor, for example, the calculator 62 is configured to obtain the altitude of the human-powered vehicle 10 from the atmospheric pressure detected by the atmospheric pressure sensor and the table related to atmospheric pressure and altitude. The altitude detector can be configured to detect a relative altitude in accordance with a difference between atmospheric pressure at a reference altitude and atmospheric pressure at the present altitude of the human-powered vehicle 10. The reference altitude is stored in advance in, for example, the storage 64. The reference altitude is set to, for example, the altitude at a location where the human-powered vehicle 10 starts traveling or the altitude at a location where the human-powered vehicle 10 ends traveling.

The altitude detector can include a position information acquisition unit configured to obtain position information, instead of or in addition to the atmospheric pressure sensor. The position information acquisition unit is configured to receive radio waves from outside the human-powered vehicle 10 to obtain position-related information. The position information acquisition unit includes, for example, a global navigation satellite system (GNSS) receiver. For example, the GNSS receiver includes a global positioning system (GPS) receiver. The GNSS receiver can include a receiver for a satellite positioning system other than the GPS. Examples of the satellite positioning system other than the GPS include a quasi-zenith satellite system (QZSS), a global navigation satellite system (GLONASS), Galileo, and the like. In a case where the position information acquisition unit includes a GPS receiver, the position information acquisition unit receives radio waves including radio waves from GPS satellites. The position information acquisition unit obtains the present position of the human-powered vehicle 10. In a case where the altitude detector includes a GPS receiver, for example, the storage 64 stores map information including altitude-related information. In a case where the altitude detector includes a GPS receiver, the calculator 62 is configured to obtain the altitude of the human-powered vehicle 10 from the position information of the human-powered vehicle 10 and the map information.

The first travel point P1 is set to, for example, any position between a location where the human-powered vehicle 10 starts traveling (travel start location) and a location where the human-powered vehicle 10 ends traveling (travel end location). The first travel point P1 can be set to the travel start location of the human-powered vehicle 10. The second travel point P2 is set to, for example, a position between the travel start location of the human-powered vehicle 10 and the travel end location of the human-powered vehicle 10 that is farther from the travel start location than the first travel point P1. The second travel point P2 can be set to the travel end location of the human-powered vehicle 10.

More than one first travel point P1 and more than one second travel point P2 can be included between the travel start location of the human-powered vehicle 10 and the travel end location of the human-powered vehicle 10. The first process includes, for example, a process for calculating the energy index in an entire section from the travel start location of the human-powered vehicle 10 to the travel end location of the human-powered vehicle 10. For example, the calculator 62 sets a first one of the first travel points P1 to the travel start location of the human-powered vehicle 10 and sets a first one of the second travel points P2 to a first predetermined location farther from the travel start location of the human-powered vehicle 10 than the first one of the first travel points P1. For example, the calculator 62 sets a second one of the first travel points P1 to the first predetermined location and sets a second one of the second travel points P2 to a second predetermined location farther from the travel start location of the human-powered vehicle 10 than the second one of the first travel points P1. Then, the calculator 62 obtains the energy index in the entire section from the travel start location of the human-powered vehicle 10 to the travel end location of the human-powered vehicle 10 by sequentially setting the first travel point P1 and the second travel point P2 in each section from the travel start location of the human-powered vehicle 10 to the travel end location of the human-powered vehicle 10.

The distance traveled from the first travel point P1 to the second travel point P2 is, for example, greater than 0 m and less than or equal to 10 m. The calculation device 60 can include a distance detector that detects the distance traveled. The distance detector can include a vehicle speed detector. In a case where the distance detector includes a vehicle speed detector, the distance detector can be integrated with the vehicle speed detector that is included in the detector 66. The time traveled from the first travel point P1 to the second travel point P2 can be greater than 0 seconds and less than or equal to 10 seconds. The calculation device 60 can include a timer.

The first process can include a process for calculating the energy index at the first travel point P1 and the second travel point P2 that are continuous downhills or uphills. The first process can include, for example, a process for calculating the energy index only at the first travel point P1 and the second travel point P2 that are continuous downhills or uphills. In a case where the first process includes the process for calculating the energy index only at the first travel point P1 and the second travel point P2 that are continuous downhills or uphills, for example, the calculator 62 obtains the energy index only at the continuous downhills or the continuous uphills in the entire section from the traveling start point of the human-powered vehicle 10 to the traveling end point of the human-powered vehicle 10.

In a case where a pitch angle of the human-powered vehicle 10 is continuously negative from the first travel point P1 to the second travel point P2, for example, the calculator 62 determines that the road is continuously downhill. In a case where the pitch angle of the human-powered vehicle 10 is continuously positive from the first travel point P1 to the second travel point P2, for example, the calculator 62 determines that the road is continuously uphill. In a case where the second altitude H2 is lower than the first altitude H1, and the section from the first travel point P1 to the second travel point P2 on a map does not include a level road or an uphill road, for example, the calculator 62 determines that the section is continuously downhill. In a case where the second altitude H2 is higher than the first altitude H1, and the section from the first travel point P1 to the second travel point P2 on a map does not include a level road or a downhill road, for example, the calculator 62 determines that the section is continuously uphill.

The energy index is, for example, an index of the riding skill of a rider. The energy index includes, for example, a first energy index related to the energy loss of the human-powered vehicle 10 that is traveling in a case where the human-powered vehicle 10 moves from the first travel point P1 to the second travel point P2. For example, the first energy index is set as a value that increases as the energy loss increases. For example, in a case where the human-powered vehicle 10 travels from the first travel point P1 to the second travel point P2, the energy loss increases if the rider cannot properly handle the vehicle body 14, such as in a case where the rider steers the handlebar 28 in an unstable manner or a case where the rider has to put his or her foot on the ground. In a case where the second altitude H2 is lower than the first altitude H1, the potential energy based on the height difference of the first altitude H1 and the second altitude H2 can be used as traveling energy. Thus, the more efficiently the rider uses the driving force and the potential energy of the human-powered vehicle 10, the smaller the energy loss becomes.

The first process includes, for example, a process for calculating the first energy index from the first parameter, the second parameter, and a third parameter related to the weight of at least one of the human-powered vehicle 10 and the rider. The third parameter includes a sum of the weight of the human-powered vehicle 10 and the weight of the rider. For example, the third parameter is measured in advance and stored in the storage 64. The third parameter can be measured in advance and stored in a storage medium other than the storage 64.

The first process can include a process for calculating the first energy index from at least one of a fourth parameter related to the driving force of the human-powered vehicle 10 during a period in which the human-powered vehicle 10 moves from the first travel point P1 to the second travel point P2, a fifth parameter related to the braking force of the brake device 42 of the human-powered vehicle 10 during a period in which the human-powered vehicle 10 moves from the first travel point P1 to the second travel point P2, and a sixth parameter related to the travel resistance of the human-powered vehicle 10 during a period in which the human-powered vehicle 10 moves from the first travel point P1 to the second travel point P2, in addition to the first parameter, the second parameter, and the third parameter. In a case where the brake device 42 is actuated, the brake device 42 converts the traveling energy into the braking energy. The braking force of the brake device 42 is taken into account in the calculation of the first energy index. Thus, the calculated first energy index further accurately reflects the riding skill of the rider operating the vehicle body 14. In a case where the human-powered vehicle 10 includes the motor 54, for example, the driving force of the human-powered vehicle 10 includes at least one of the human driving force and the driving force of the motor 54. In a case where the human-powered vehicle 10 includes the motor 54, for example, the driving force of the human-powered vehicle 10 includes both the human driving force and the driving force of the motor 54.

The first process can include a process for calculating a first potential energy of the human-powered vehicle 10 at the first travel point P1 and a first kinetic energy of the human-powered vehicle 10 at the first travel point P1 from the first parameter and the third parameter related to the weight of at least one of the human-powered vehicle 10 and the rider, a process for calculating a second potential energy of the human-powered vehicle 10 at the second travel point P2 and a second kinetic energy of the human-powered vehicle 10 at the second travel point P2 from the second parameter and the third parameter, and a process for calculating the first energy index from a first value obtained by subtracting a second sum of the second potential energy and the second kinetic energy from a first sum of the first potential energy and the first kinetic energy.

The first process can include a process for calculating the first energy index from the first value and at least one of the driving force of the human-powered vehicle 10 during a period in which the human-powered vehicle 10 moves from the first travel point P1 to the second travel point P2, the braking force of the brake device 42 of the human-powered vehicle 10 during a period in which the human-powered vehicle 10 moves from the first travel point P1 to the second travel point P2, and the travel resistance of the human-powered vehicle 10 during a period in which the human-powered vehicle 10 moves from the first travel point P1 to the second travel point P2.

The fourth parameter is obtained from, for example, a cumulative sum of the driving force of the human-powered vehicle 10 during a period in which the human-powered vehicle 10 moves from the first travel point P1 to the second travel point P2. The fourth parameter can be obtained from an integral of the driving force of the human-powered vehicle 10 during a period in which the human-powered vehicle 10 moves from the first travel point P1 to the second travel point P2. The fourth parameter includes, for example, an energy provided by the driving force of the human-powered vehicle 10 during a period in which the human-powered vehicle 10 moves from the first travel point P1 to the second travel point P2. In a case where the human-powered vehicle 10 includes the motor 54, for example, the fourth parameter includes both an energy provided by the human driving force during a period in which the human-powered vehicle 10 moves from the first travel point P1 to the second travel point P2 and an energy provided by the driving force of the motor 54 during the period in which the human-powered vehicle 10 moves from the first travel point P1 to the second travel point P2.

The human driving force corresponds to, for example, a propulsion force of the human-powered vehicle 10 produced by a user rotating the crank axle 20. The human driving force corresponds to, for example, driving force input to at least one first rotational body 34 by a user rotating the crank axle 20. The human driving force is represented by, for example, at least one of torque and power. Power of the human driving force is, for example, a product of the torque applied to the crank axle 20 and the rotational speed of the crank axle 20. For example, the calculator 62 obtains the propulsion force applied to the human-powered vehicle 10 by the human driving force from a detection result of the human driving force detector 48.

The driving force of the motor 54 corresponds to, for example, a propulsion force applied to the human-powered vehicle 10 by the motor 54. The driving force of the motor 54 is represented by, for example, at least one of torque and power. Power of the driving force of the motor 54 is, for example, a product of the torque applied to the transferring member 38 by the motor 54 and the rotational speed of the motor 54. For example, the calculator 62 obtains the propulsion force applied to the human-powered vehicle 10 by the motor 54 from a detection result of the motor driving force detector.

The fifth parameter is obtained from, for example, a vehicle speed (a pre-braking vehicle speed) before the brake device 42 is actuated and a vehicle speed (a post-braking vehicle speed) after the brake device 42 is actuated during a period in which the human-powered vehicle 10 moves from the first travel point P1 to the second travel point P2. The fifth parameter can be obtained from a detection result of the detecting device 44 configured to measure the braking force of the brake device 42. The fifth parameter can be obtained from a cumulative sum of the braking force of the brake device 42 during a period in which the human-powered vehicle 10 moves from the first travel point P1 to the second travel point P2. The fifth parameter includes, for example, an energy lost by actuation of the brake device 42 during a period in which the human-powered vehicle 10 moves from the first travel point P1 to the second travel point P2.

The sixth parameter is obtained from, for example, at least one of the air resistance of the human-powered vehicle 10, the rolling resistance of the wheel 12, the gradient resistance of a road traveled by the human-powered vehicle 10, the acceleration resistance of the human-powered vehicle 10, a parameter for calculating the air resistance of the human-powered vehicle 10, a parameter for calculating the rolling resistance of the wheel 12, a parameter for calculating the gradient resistance of a road traveled by the human-powered vehicle 10, and a parameter for detecting the acceleration resistance of the human-powered vehicle 10 during a period in which the human-powered vehicle 10 moves from the first travel point P1 to the second travel point P2. The sixth parameter includes, for example, an energy lost by the travel resistance during a period in which the human-powered vehicle 10 moves from the first travel point P1 to the second travel point P2.

Figure 3:
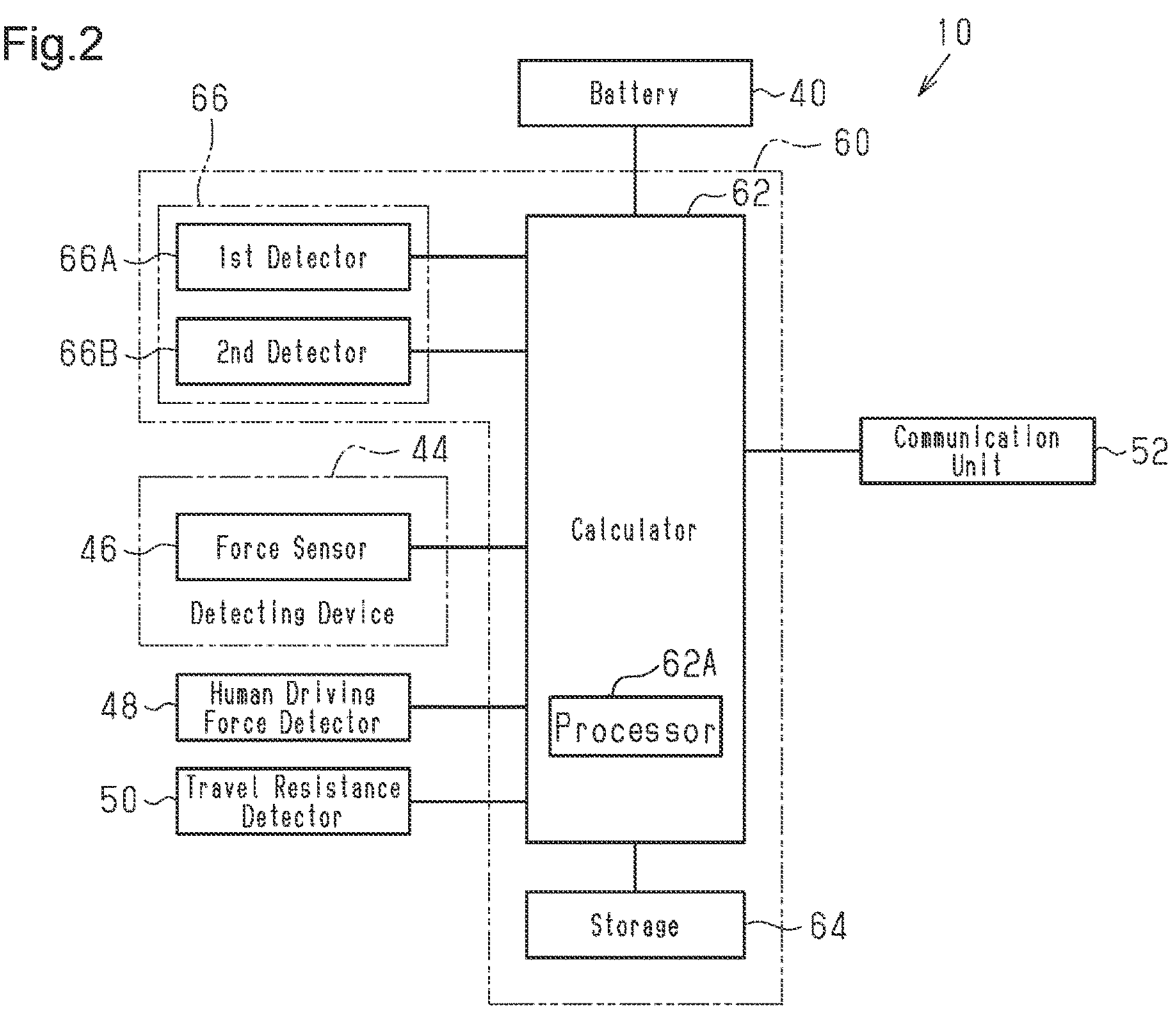
FIG. 3 is a schematic diagram schematically showing a first travel point and a second travel point that are continuous downhills.

As shown in FIG. 3, for example, in a case where the first travel point P1 and the second travel point P2 are set on a continuous downhill, the first travel point P1 is set at a position closer to the start point of the downhill than the second travel point P2. In the present embodiment, the calculator 62 obtains the first energy index from the first value, which is calculated from the first to third parameters, and at least one of the fourth parameter, the fifth parameter, and the sixth parameter.

The first process includes, for example, a process for calculating the first sum by Equation (1). In Equation (1), the term "m" represents the sum of the weight of the human-powered vehicle 10 and the weight of the rider. In Equation (1), the term "g" represents gravitational acceleration. In Equation (1), the term "V1" represents the first vehicle speed V1. In Equation (1), the term "H1" represents the first altitude H1. In Equation (1), the term "A1" represents the first sum. The unit of the first sum is, for example, joule (J). The term "(m×V1×V1)/2" in Equation (1) represents the first potential energy. The term "m×g×H1" in Equation (1) represents the first kinetic energy.

$$A1 = \{(m \times V1 \times V1/2 + m \times g \times H1\} \quad \text{Equation (1)}$$

The first process includes, for example, a process for calculating the second sum by Equation (2). In Equation (2), the term "m" represents the sum of the weight of the human-powered vehicle 10 and the weight of the rider. In Equation (2), the term "g" represents gravitational acceleration. In Equation (2), the term "V2" represents the second vehicle speed V2. In Equation (2), the term "H2" represents the second altitude H2. In Equation (2), the term "A2" represents the second sum. The unit of the second sum is, for example, joule (J). The term "(m×V2×V2)/2" in Equation (2) represents the second potential energy. The term "m×g×H2" in Equation (2) represents the second kinetic energy.

$$A2 = \{(m \times V2 \times V2)/2 + m \times g \times H2\} \quad \text{Equation (2)}$$

The first process includes, for example, a process for calculating the first value by Equation (3). In Equation (3), the term "B1" represents the first value. The unit of the first value is, for example, joule (J).

$$B1 = A1 - A2 \quad \text{Equation (3)}$$

The first process includes, for example, a process for calculating the first energy index by Equation (4). In Equation (4), the term "X1" represents the fourth parameter. In Equation (4), the term "X2" represents the fifth parameter. In Equation (4), the term "X3" represents the sixth parameter. In Equation (4), the term "E1" represents the first energy index. The unit of the first energy index is, for example, joule (J).

$$E1 = B1 + X1 - X2 - X3 \quad \text{Equation (4)}$$

In the process for calculating the first energy index by Equation (4), the term related to the sixth parameter can be omitted. In this case, the first energy index is calculated by Equation (4-1) in the first process. In a case where the first energy index is calculated by Equation (4-1), for example, the energy index related to the sixth parameter is included in the first energy index.

$$E1 = B1 + X1 - X2 \quad \text{Equation (4-1)}$$

In the process for calculating the first energy index by Equation (4-1), at least one of the terms related to the fourth parameter and the fifth parameter can be omitted. In a case where the terms related to the fourth parameter and the fifth parameter are omitted, the first energy index calculated by Equation (4-1) in the first process is the same as the first value.

An example of the first process in which the calculator 62 obtains the first energy index will now be described with reference to FIG. 4. For example, in a case where an operation for calculating the first energy index is performed on an operation device or the like, the calculator 62 starts the process of the flowchart shown in FIG. 4 from step S11. In a case where the first process includes a process for calculating the energy index in the entire section from the travel start location of the human-powered vehicle 10 to the travel end location of the human-powered vehicle 10, the calculator 62 can sequentially calculate the first energy index in each section. In a case where the calculator 62 obtains the first energy index as the human-powered vehicle 10 travels, for example, the calculator 62 starts the process of the flowchart shown in FIG. 4 from step S11 in a case where electric power is supplied to the calculator 62. In a case where the calculator 62 obtains the first energy index as the human-powered vehicle 10 travels and the process of the flowchart shown in FIG. 4 ends, for example, the calculator 62 repeats the process from step S11 in predetermined cycles until the supply of electric power stops.

In step S11, the calculator 62 determines whether the human-powered vehicle 10 has moved from the first travel point P1 to the second travel point P2. For example, the calculator 62 determines that the human-powered vehicle 10 has moved from the first travel point P1 to the second travel point P2 in at least one of a case where the human-powered vehicle 10 travels for a predetermined distance and a case where the human-powered vehicle 10 travels for a predetermined time period. The calculator 62 can determine that the human-powered vehicle 10 has moved from the first travel point P1 to the second travel point P2 based on a signal from an external device. The calculator 62 can determine that the human-powered vehicle 10 has moved from the first travel point P1 to the second travel point P2 based on the position information. In a case where the human-powered vehicle 10 has moved from the first travel point P1 to the second travel point P2 in step S11, the calculator 62 proceeds to step S12. In a case where the human-powered vehicle 10 has not moved from the first travel point P1 to the second travel point P2 in step S11, the calculator 62 ends processing.

In step S12, the calculator 62 obtains the first sum of the first potential energy and the first kinetic energy from the first parameter and the third parameter. Then, the calculator 62 proceeds to step S13. For example, the calculator 62 obtains the first sum of the first potential energy and the first kinetic energy by Equation (1) in step S12. In step S13, the calculator 62 obtains the second sum of the second potential energy and the second kinetic energy from the second parameter and the third parameter. Then, the calculator 62 proceeds to step S14. For example, the calculator 62 obtains the second sum of the second potential energy and the second kinetic energy by Equation (2) in step S13.

In step S14, the calculator 62 obtains the first value by subtracting the second sum from the first sum, and then proceeds to step S15. For example, the calculator 62 obtains the first value by Equation (3) in step S14, and then proceeds to step S15. In step S15, the calculator 62 obtains the first energy index from the first value and at least one of the fourth parameter, the fifth parameter, and the sixth parameter. Then, the calculator 62 ends processing. The calculator 62 obtains the first energy index by Equation (4) in step S15. The calculator 62 can calculate the first energy index by Equation (4-1) in step S15. Step S15 can be omitted. In a case where step S15 is omitted, the calculator 62 uses the first value as the first energy index and ends processing after step S14.

Second Embodiment

A human-powered vehicle calculation device 60 in accordance with a second embodiment will now be described with reference to FIGS. 4 and 5. Same reference numerals are given to those components of the human-powered vehicle calculation device 60 in the second embodiment that are the same as the corresponding components in the first embodiment. Such components will not be described in detail.

In the present embodiment, the energy index includes a second energy index related to the energy efficiency of the human-powered vehicle 10 in a case where the human-powered vehicle 10 moves from the first travel point P1 to the second travel point P2. For example, the second energy index is set as a value that increases or decreases as the energy efficiency increases. For example, in a case where the human-powered vehicle 10 travels from the first travel point P1 to the second travel point P2, the energy efficiency increases if the rider operates the vehicle body 14 in a skilled manner and stably steers the handlebar 28 without putting his or her foot on the ground. In a case where the second altitude H2 is lower than the first altitude H1, the potential energy based on the height difference of the first altitude H1 and the second altitude H2 can be used as traveling energy. Thus, the more efficiently the rider uses the driving force and the potential energy of the human-powered vehicle 10, the greater the energy efficiency becomes.

In the present embodiment, the first process includes a process for calculating the first potential energy of the human-powered vehicle 10 at the first travel point P1 and the first kinetic energy of the human-powered vehicle 10 at the first travel point P1 from the first parameter and the third parameter related to the weight of at least one of the human-powered vehicle 10 and the rider, a process for calculating the second potential energy of the human-powered vehicle 10 at the second travel point P2 and the second kinetic energy of the human-powered vehicle 10 at the second travel point P2 from the second parameter and the third parameter, and a process for calculating the second energy index from a ratio of the first sum of the first potential energy and the first kinetic energy and the second sum of the second potential energy and the second kinetic energy.

In a case where the energy index includes the second energy index, for example, the first process includes a process for calculating the second energy index by Equation (5-1) or Equation (5-2). In Equations (5-1) and (5-2), the term "E2" represents the second energy index. The unit of the second energy index is, for example, joule (J). In Equation (5-1), the term "A1" is greater than the term "A2". In Equation (5-2), the term "A2" is greater than the term "A1".

$$E2 = A2/A1 \qquad \text{Equation (5-1)}$$

$$E2 = A1/A2 \qquad \text{Equation (5-2)}$$

An example of the first process in which the calculator 62 obtains the second energy index will now be described with reference to FIGS. 4 and 5. For example, in a case where an operation for calculating the first energy index is performed on an operation device or the like, the calculator 62 starts the process of the flowchart shown in FIG. 4 from step S11. In a case where the first process includes a process for calculating the energy index in the entire section from the travel start location of the human-powered vehicle 10 to the travel end location of the human-powered vehicle 10, the calculator 62 can sequentially calculate the second energy index in each section. In a case where the calculator 62 obtains the second energy index as the human-powered vehicle 10 travels, for example, the calculator 62 starts the process of the flowchart shown in FIG. 4 from step S11 in a case where electric power is supplied to the calculator 62. In a case where the calculator 62 obtains the second energy index as the human-powered vehicle 10 travels and the process of the flowcharts shown in FIGS. 4 and 5 end, for example, the calculator 62 repeats the process from step S11 in predetermined cycles until the supply of electric power stops.

Figure 4:
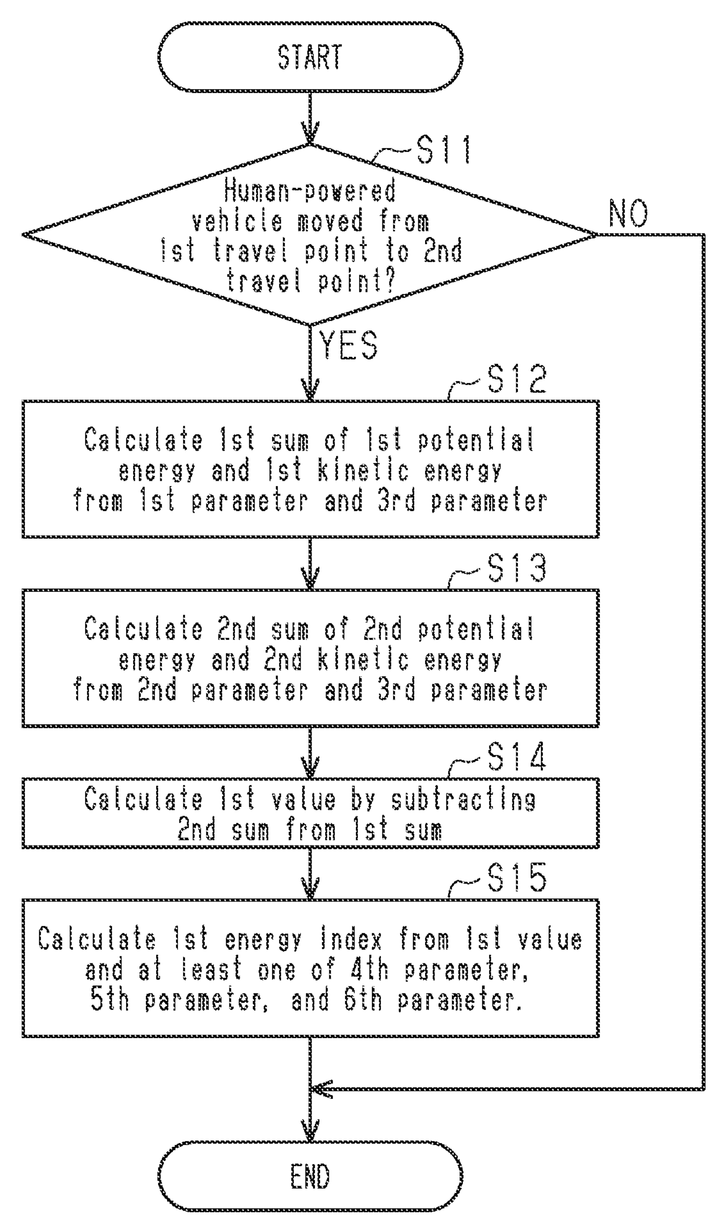
FIG. 4 is a flowchart illustrating a process executed by a calculator shown in FIG. 2 to calculate a first energy index.
Figure 5:
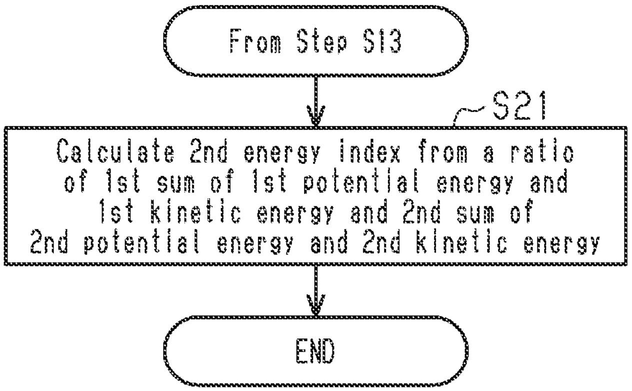
FIG. 5 is a flowchart illustrating a calculation process executed by a calculator to calculate a second energy index in accordance with a second embodiment.

The calculator 62 performs the same process as that in the first embodiment from step S11 to step S13 shown in FIG. 4. After step S13 of FIG. 4, the calculator 62 proceeds to step S21 of FIG. 5. In step S21, the calculator 62 obtains the second energy index from the ratio of the first sum of the first potential energy and the first kinetic energy and the second sum of the second potential energy and the second kinetic energy. Then, the calculator 62 ends processing. For example, the calculator 62 obtains the second energy index by Equation (5-1) or Equation (5-2) in step S21.

MODIFICATIONS

The description related with the above embodiments exemplifies, without any intention to limit, applicable forms of a method for calculating an energy index, a program related to a calculation device for a human-powered vehicle, and a calculation device for a human-powered vehicle according to the present disclosure. In addition to the embodiments described above, the method for calculating an energy index, the program related a calculation device for a human-powered vehicle, and the calculation device for a human-powered vehicle according to the present disclosure are applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

The calculation device 60 can be a device that is not mounted on the human-powered vehicle 10. The calculation device 60 can be at least one of a personal computer, a smartphone, and a tablet computer. In a case where the calculation device 60 is a device that is not mounted on the human-powered vehicle 10, for example, the calculation device 60 is configured to obtain the information detected by the first detector 66A and the information detected by the second detector 66B. The calculation device 60 can include an acquisition unit that obtains information for calculating the first energy index from the storage 64 that stores the information for calculating the first energy index. Alternatively, the calculation device 60 can include a receiving unit that receives the information for calculating the first energy index as the human-powered vehicle 10 travels. The information for calculating the first energy index includes, for example, a detection result of the first detector 66A and a detection result of the second detector 66B.

The method for calculating an energy index can include a second process for calculating an energy index that is related to traveling of the human-powered vehicle 10 from a difference of a first mechanical energy of the human-powered vehicle 10 including the first potential energy of the human-powered vehicle 10 at the first travel point P1 and a second mechanical energy of the human-powered vehicle 10 including the second potential energy of the human-powered vehicle 10 at the second travel point P2 differing from the first travel point P1. The first mechanical energy further includes, for example, the first kinetic energy of the human-powered vehicle 10 at the first travel point P1. The second mechanical energy further includes, for example, the second kinetic energy of the human-powered vehicle 10 at the second travel point P2.

In a case where the human-powered vehicle 10 travels on a course including a number of areas having different traveling environments, the first travel point P1 and the second travel point P2 can be set for each area. In a case where the human-powered vehicle 10 travels on a course including a number of areas having different traveling environments, for example, the storage 64 is configured to store information that associates the energy index calculated in each area with a course map stored in advance in the storage 64. In a case where the human-powered vehicle 10 travels on a course including a number of areas having different traveling environments, the storage 64 can be configured to store information that associates an ideal energy index with a course map stored in advance in the storage 64. For example, the ideal energy index is set based on an energy index in a case where a professional rider travels from the first travel point P1 to the second travel point P2.

The calculator 62 can be configured to accumulate the energy index in the entire section from the travel start location of the human-powered vehicle 10 to the travel end location of the human-powered vehicle 10.

The calculator 62 can be configured to obtain the energy index only in a case where the rider is not pedaling in a case where the entire section from the travel start location of the human-powered vehicle 10 to the travel end location of the human-powered vehicle 10 is continuously downhill or a case where the section from the first travel point P1 to the second travel point P2 is continuously downhill.

The phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

What is claimed is:

1. A method for calculating an energy index, the method comprising:

using a processor to execute calculating a first energy index and a second energy index as the energy index, the first energy index being related an energy loss incurred when a human-powered vehicle moves from a first travel point to a second travel point differing from the first travel point and the second energy index being related to an energy efficiency of the human-powered vehicle as the human-powered vehicle moves from the first travel point to the second travel point, and controlling a brake device of the human-powered vehicle based on the energy index the second energy index being calculated by calculating a first potential energy of the human-powered vehicle at the first travel point and a first kinetic energy of the human-powered vehicle at the first travel point based on a first parameter and a third parameter, the first parameter including a first vehicle speed and a first altitude at the first travel point and the third parameter being related to a weight of at least one of the human-powered vehicle and a rider, calculating a second potential energy of the human-powered vehicle at the second travel point and a second kinetic energy of the human-powered vehicle at the second travel point based on a second parameter and the third parameter, the second parameter including a second vehicle speed and a second altitude at the second travel point, and calculating the second energy index from a ratio of a first sum of the first potential energy and the first kinetic energy and a second sum of the second potential energy and the second kinetic energy.

2. The method according to claim 1, wherein the calculating of the energy index further includes calculating the first energy index from the first parameter, the second parameter, and the third parameter.

3. The method according to claim 2, wherein the calculating of the energy index further includes calculating the first energy index from at least one of a fourth parameter related to a driving force of the human-powered vehicle during a period in which the human-powered vehicle moves from the first travel point to the second travel point, a fifth parameter related to a braking force of a brake device of the human-powered vehicle during the period in which the human-powered vehicle moves from the first travel point to the second travel point, and a sixth parameter related to a travel resistance of the human-powered vehicle during the period in which the human-powered vehicle moves from the first travel point to the second travel point in addition to the first parameter, the second parameter, and the third parameter.

4. The method according to claim 3, wherein the fourth parameter is obtained from a cumulative sum of the driving force during the period in which the human-powered vehicle moves from the first travel point to the second travel point.

5. The method according to claim 3, wherein the fifth parameter is obtained from a pre-braking vehicle speed before the brake device is actuated and a post-braking vehicle speed after the brake device is actuated during a period in which the human-powered vehicle moves from the first travel point to the second travel point.

6. The method according to claim 3, wherein the fifth parameter is obtained from a detection result of a detecting device configured to measure the braking force of the brake device.

7. The method according to claim 1, wherein the calculating of the energy index further includes:

calculating the first energy index from a first value obtained by subtracting the second sum from the first sum.

8. The method according to claim 7, wherein the calculating of the energy index further includes calculating the first energy index from the first value and at least one of a driving force of the human-powered vehicle during a period in which the human-powered vehicle moves from the first travel point to the second travel point, a braking force of a brake device of the human-powered vehicle during the period in which the human-powered vehicle moves from the first travel point to the second travel point, and a travel resistance of the human-powered vehicle during the period in which the human-powered vehicle moves from the first travel point to the second travel point.

9. The method according to claim 1, wherein distance traveled from the first travel point to the second travel point is greater than 0 m and less than or equal to 10 m.

10. The method according to claim 1, wherein time traveled from the first travel point to the second travel point is greater than 0 seconds and less than or equal to 10 seconds.

11. The method according to claim 1, wherein the calculating of the energy index further includes calculating the energy index at the first travel point and the second travel point that are continuous downhills or continuous uphills.

12. A non-transitory computer-readable medium encoded with an energy index calculation program, which, when executed by a calculation device for a human-powered vehicle that includes the processor, causes the calculation device to perform operations comprising:

calculating the energy index through the method according to claim 1.

13. A calculation device for a human-powered vehicle, the calculation device comprising:

a calculator including the processor, the calculator being configured to calculate the energy index through the method according to claim 1.

14. The calculation device according to claim 13, wherein the calculation device is configured to be mountable on the human-powered vehicle, the calculation device further comprising:

a first detector configured to detect the first parameter; and a second detector configured to detect the second parameter.

15. A calculation device for calculating a riding skill index indicating a riding skill of a rider of a human-powered vehicle, the calculation device comprising:

a vehicle speed sensor;

an altitude sensor;

a display; and a processor communicatively connected to the vehicle speed sensor, the altitude sensor, and the display, the processor being configured to calculate the riding skill index based on an energy index including a first energy index and a second energy index, the first energy index being related to an energy loss incurred when the human-powered vehicle moves from to a second travel point differing from the first travel point and the second energy index being related to an energy efficiency of the human-powered vehicle as the human-powered vehicle moves from the first travel point to the second travel point, and control the display to display the riding skill index, the second energy index being calculated by calculating a first potential energy of the human-powered vehicle at the first travel point and a first kinetic energy of the human-powered vehicle at the first travel point based on a first parameter and a third parameter, the first parameter including a first vehicle speed and a first altitude at the first travel point detected by the vehicle speed sensor and the altitude sensor, respectively, and the third parameter being related to a weight of at least one of the human-powered vehicle and the rider, calculating a second potential energy of the human-powered vehicle at the second travel point and a second kinetic energy of the human-powered vehicle at the second travel point based on a second parameter and the third parameter, the second parameter including a second vehicle speed and a second altitude at the second travel point detected by the vehicle speed sensor and the altitude sensor, respectively, and calculating the second energy index from a ratio of a first sum of the first potential energy and the first kinetic energy and a second sum of the second potential energy and the second kinetic energy, the processor being further configured to determine that the rider cannot properly handle a vehicle body of the human powered vehicle in a case where the energy loss increases.

* * * * *